Dec. 9, 1930.   B. BRONSON   1,784,780
VULCANIZING PRESS
Filed Nov. 1, 1927   4 Sheets-Sheet 1
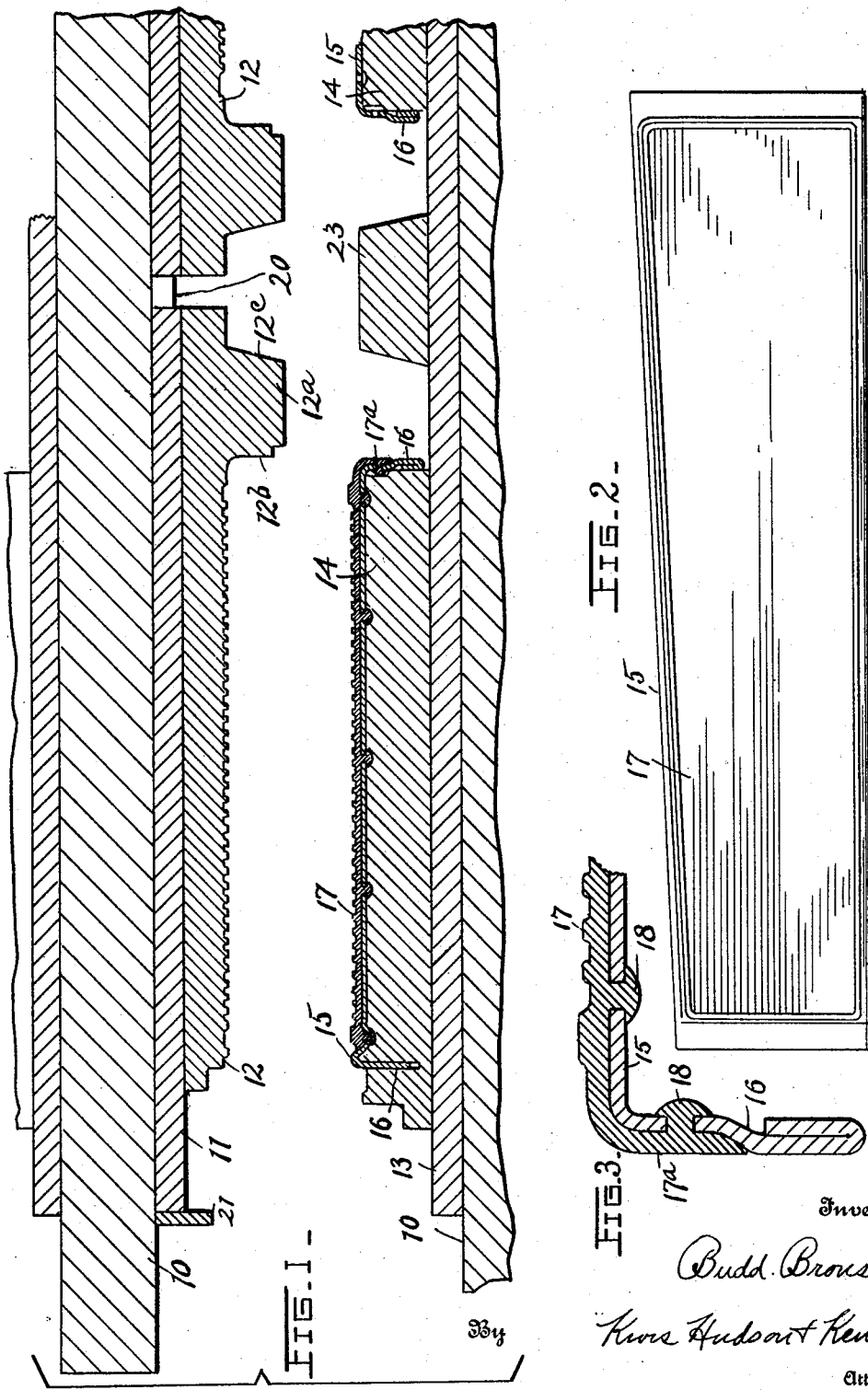

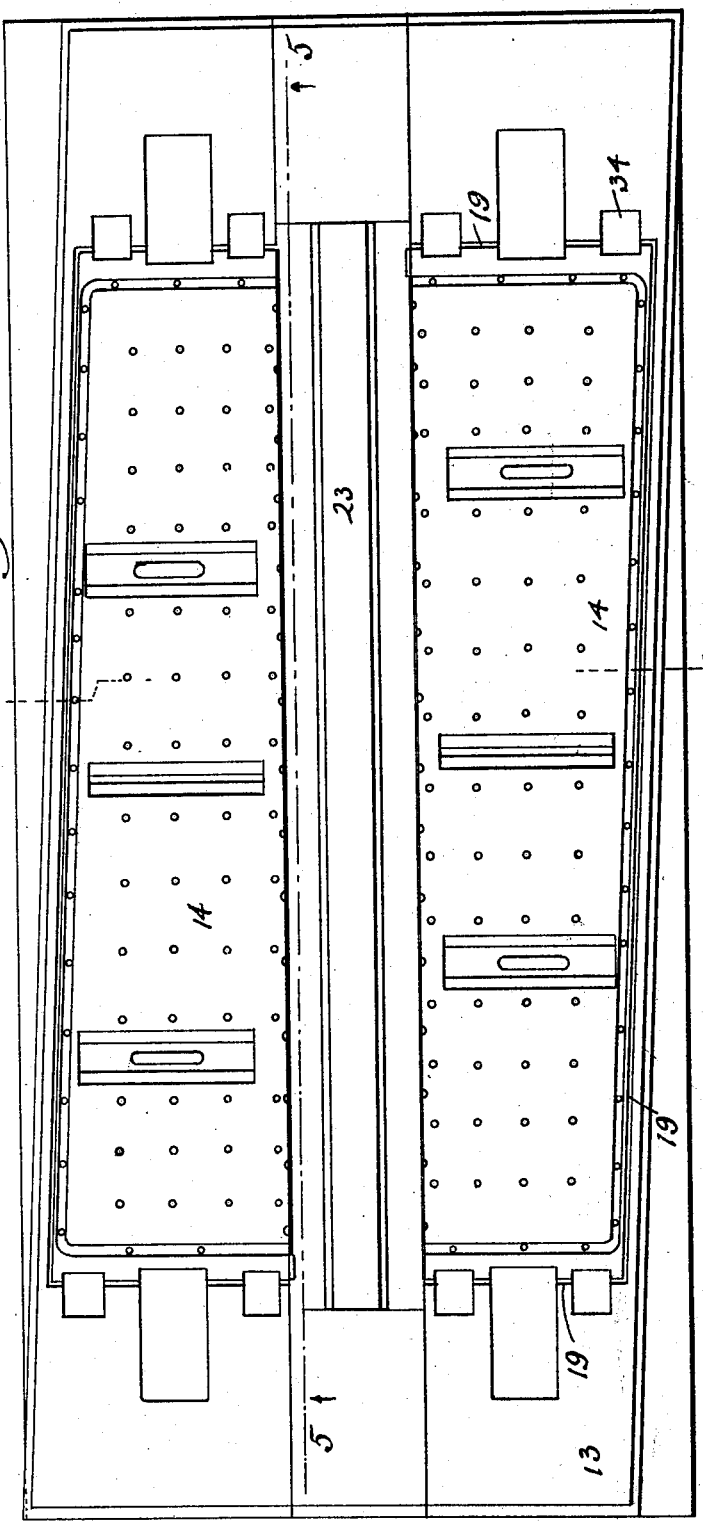
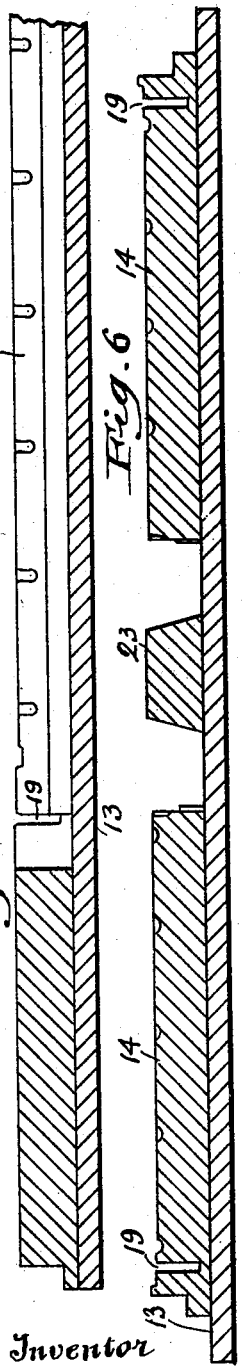

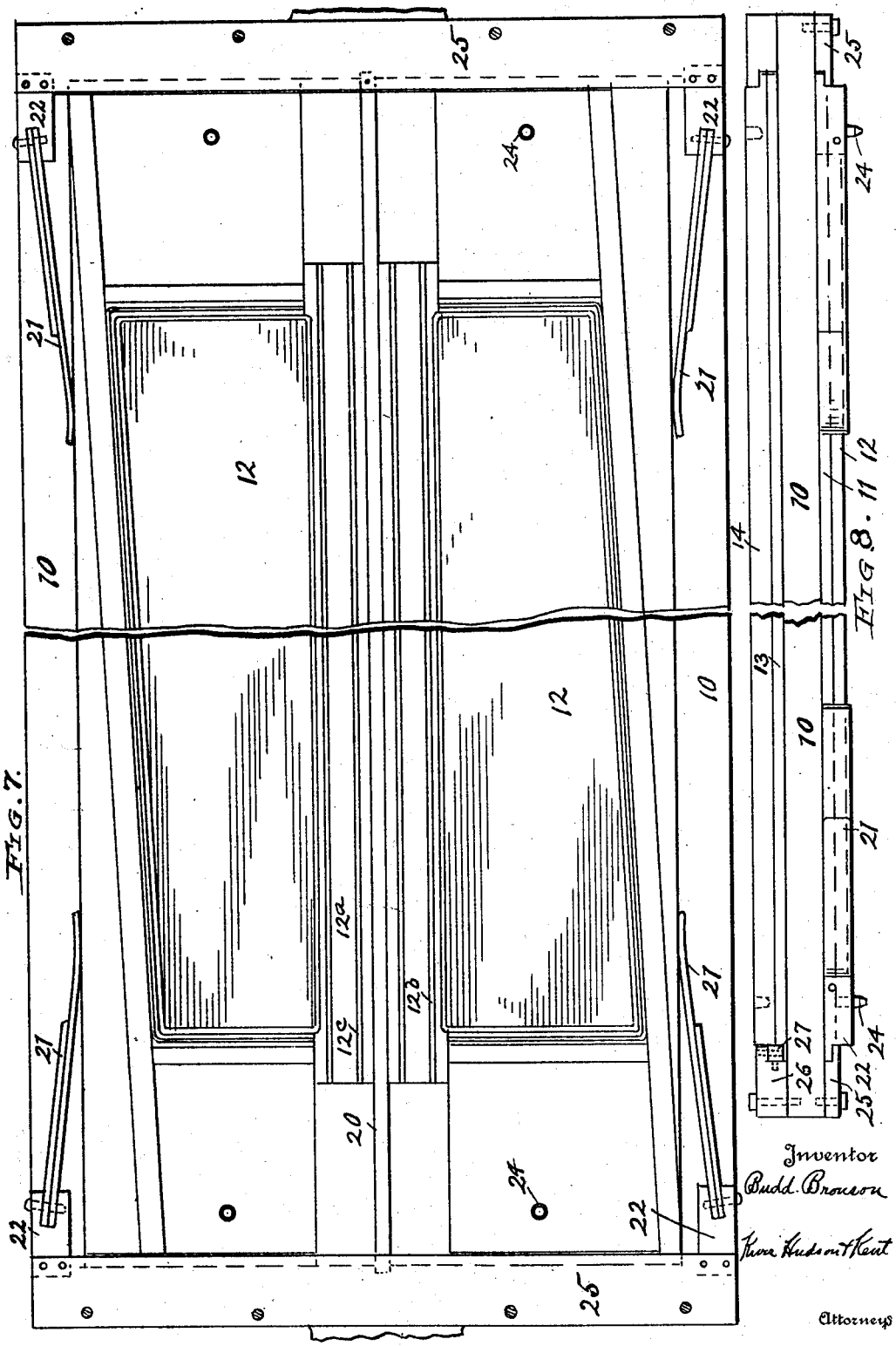

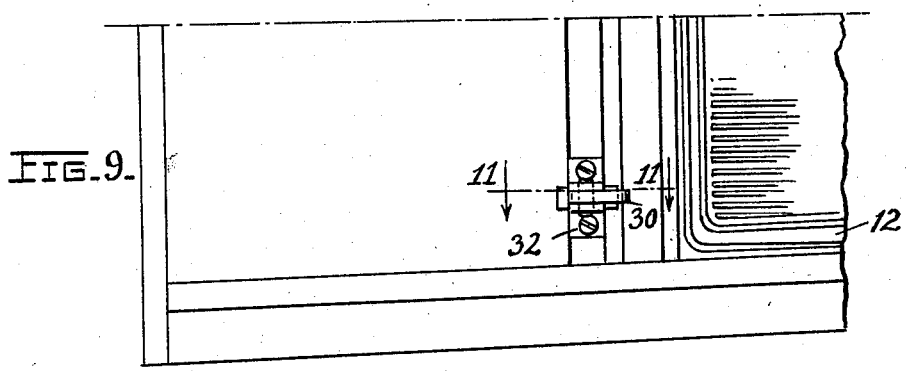
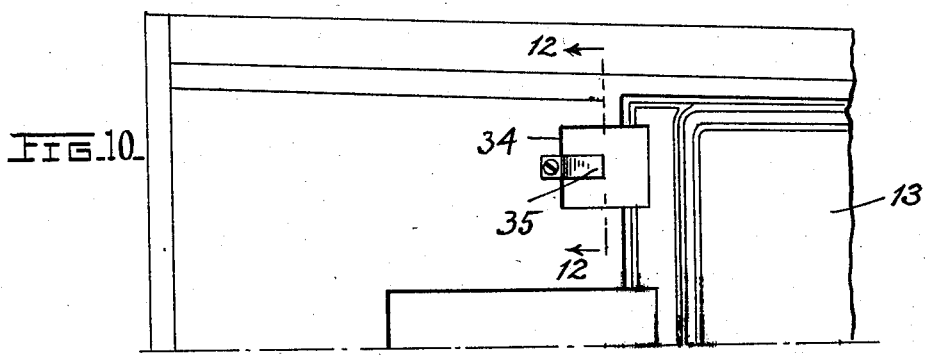
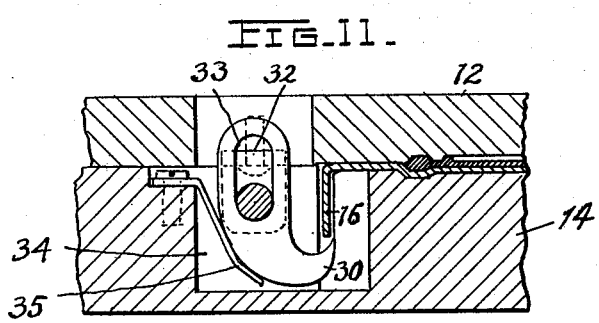
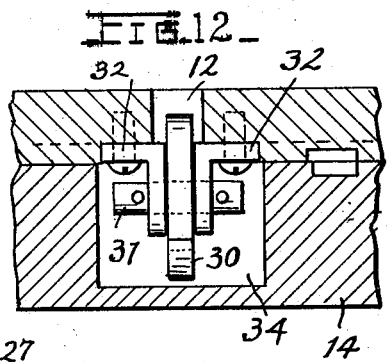
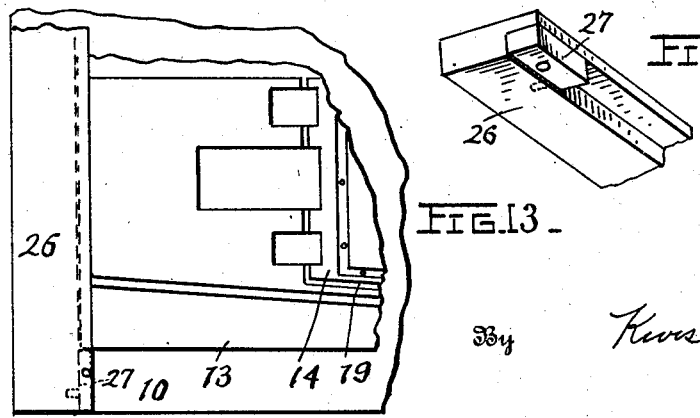

Patented Dec. 9, 1930

1,784,780

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

VULCANIZING PRESS

Application filed November 1, 1927. Serial No. 230,272.

This invention relates to a vulcanizing press adapted for vulcanizing rubber to metal.

The chief object of the invention is to provide a press suitable for molding and vulcanizing rubber in sheet form onto relatively large sheet metal members, as, for example, running board bodies, which may be flanged at their margins, depending upon the nature or purpose of the completed article, and which may have two angularly disposed portions such as the top and front which are adapted to have the rubber fastened and vulcanized thereto and at the same time molded to the proper configuration and shape.

Another object of the invention is to provide a press which has a large capacity and which causes the rubber to be vulcanized and effectively secured to running board bodies or other metal members of more or less similar nature.

A further object is to provide a construction wherein the rubber is properly molded and caused to be vulcanized and effectively secured to angularly disposed portions of the metal body, which portions may be at right angles to each other.

A still further object is to secure the mold members to platens of the press in a manner such as to admit of their quick and easy removal or replacement if for any reason, as for the purpose of repairs, it may be desirable to remove or change the molds.

A still further object is to provide a construction which admits of rapid unloading of the press, this feature having particular reference to presses for molding and vulcanizing rubber to flanged members which under the severe pressure of the press have their flanges driven into receiving slots of one mold member, this part of my invention serving to pull the flanges from the slots and therefore overcome the tight engagement between the metal and the mold member.

The above and other objects are attained by my invention which may be here briefly summarized as consisting in certain novel details of construction and combinations and arrangements of parts which will be described in the specification and set forth in the appended claims.

The running board herein illustrated forms no part of the present invention but is claimed in my copending application Serial No. 241,771, filed December 22, 1927.

In the accompanying sheets of drawings wherein I have illustrated the preferred embodiment of my invention, Fig. 1 is a sectional view showing juxtaposed portions of the upper and lower mold members of a vulcanizing press adapted in this particular instance for molding and vulcanizing rubber to sheet metal running board bodies; Fig. 2 is a plan view of one of the running boards; Fig. 3 is an enlarged detail sectional view showing how the rubber not only covers the top but is extended down for a distance over the front of the running board body; Fig. 4 is a plan view of the lower mold member which is adapted to be secured to a platen of the press; Fig. 5 is an enlarged partial longitudinal sectional view, the section being taken substantially along the line 5—5 of Fig. 4; Fig. 6 is a transverse sectional view on the same scale as in Fig. 5, the section being taken substantially along the line 6—6 of Fig. 4; Fig. 7 is a bottom view of the upper mold member, the same being secured to a platen of the press; Fig. 8 is a side view of the platen having secured to opposite sides thereof the lower mold member of one mold and the upper mold member of another mold, the press which I employ being preferably of the multi-platen type with the platens arranged one above the other; Figs. 9 and 10 are face views of portions of the upper and lower members respectively of the mold showing the application of lifting hooks for lifting from the lower mold members the completed articles as the mold members separate following the vulcanizing operation, Figs. 11 and 12 are enlarged detail sectional views, one section being at right angles to the other, and both showing the lifting hooks, Fig. 13 is a fragmentary top plan view showing the corner of the upper mold member attached to the platen; and Fig. 14 is a detail perspective view showing a portion of the end plate for holding the mold member to the platen.

The general type of press to which I prefer to apply the various features of my invention is old and well known, this consisting of a series of superposed platens to the upper and lower faces of which mold members are adapted to be applied, forming a series of molds. The press is opened and closed by a hydraulic plunger, the platens being slidable on fixed rods between a fixed abutment at the top and the plunger beneath, the press being closed by elevating the plunger which closes first the lowermost mold and the remainder successively, and being opened by lowering the plunger this first causing the uppermost mold to be opened and the remainder in succession. However, I do not limit my invention to a press of this type and I refer to this press because it is used by me in practice. Furthermore, for the purpose of obtaining the desired capacity, each mold is preferably of the multiple type in the sense that it accommodates side by side a plurality of members to be vulcanized, but I do not regard this feature as essential to my invention though preferable as to certain features or phases thereof, as will be explained presently.

Referring now to the drawings, the platens are designated 10, two of these being shown in Fig. 1 in superposed relation. On adjacent faces of the platens the upper and lower members of the mold or of a plurality of molds are provided. In this instance two molds are provided on the adjacent faces of each pair of platens. For a purpose to be explained presently, the upper halves of the mold include two separate laterally movable mold plates 11 each having secured thereto a mold member 12, while the lower halves of the molds are composed of a mold plate 13 to which are secured in fixed position two mold members 14, the plate 13 being held in fixed position on the platen.

Although the invention is not necessarily confined to a vulcanizing press for producing rubber covered running boards, the molds here shown are designed for that purpose, and in Figs. 1, 2 and 3 the running board is illustrated. This running board is provided with a sheet metal body 15 with flanges 16 extending down from the four sides, and it is provided with a covering of rubber 17 which overlies the major portion of the top surface of the running board body and has a lip or extension 17ª covering the major portion of the front flange of the running board body. With this press the rubber is molded onto the running board body and vulcanized in contact therewith. It is held in place not only by the adherence of the rubber to the top surface and front portion of the running board body but it is locked thereto preferably by the equivalent of rivets of rubber 18 formed by squeezing the uncured rubber through openings provided in the running board body and causing the lower ends of the rubber lugs to be expanded on the lower or inner side of the running board body, as best illustrated in Fig. 3. In order that this might be done, the top face of each lower mold member 14 is provided with depressions to accommodate the rubber to form the rivet heads.

The rubber may be given any suitable configuration on its top surface, but in this instance it is shown as ribbed, this being provided by giving the lower side of the upper mold member 12 a corresponding configuration.

By reference to Figs. 1 and 4, it will be seen that the front flange of the running board body is adapted to bear against the inner upright face of the lower mold member 14 while the end and rear flanges are adapted to be driven down into slots 19 formed in the mold member 14. (See Fig. 4.) As the pressure exerted on the board when the press closes is very severe, this drives the flanges of the running board tightly into the slots of the mold member, making advisable the use of lifting hooks which I will describe presently.

The upper mold member 12 has a horizontal portion which forms or molds the portion of the rubber covering 17 overlying the top of the running board body, thus providing the ribs or other configuration which the rubber covered top of the running board is to have. Additionally, the upper mold member 12 has a substantially right angular extension 12ª, the face 12ᵇ of which is adapted to engage and mold the rubber covering to the front flange of the running board body and to secure it to the flange. There is a fillet or rounded portion joining the main portion 12 and the extension 12ª of the mold member so that the rubber covered angle between the top and front of the running board will be rounded, as illustrated in Figs. 1 and 3. The face 12ᶜ of the extension 12ª, i. e., the face remote from the mold member 13, is on a taper, as clearly shown in Fig. 1.

Assuming that there are two of the mold members 12 on the lower face of the upper platen, both will be similarly constructed, and, normally when the press is open these two mold members occupy substantially the relative positions indicated in Fig. 1, the adjacent or contiguous edges of the mold plates 11 and of the mold member 12 being adjacent each other but being spaced apart by suitable stops 20, note Fig. 1. They are held in this position when the press is open by springs 21, note particularly Fig. 7, which springs at their free ends engage the outer edges of the mold plates 11 and have their outer ends secured in spring blocks 22 which are suitably secured to the platen adjacent the outer corners thereof.

In order that the rubber which is adapted to extend from the top down over the front of the running board may be molded and vulcanized to the front of the running board simultaneously with the molding of the rubber extending over the top or main portion of the running board body, it is essential that at or near the end of the closing movement of the press the upper mold members 12 be spread apart or given a lateral movement so that the faces 12$^b$ of the mold member extensions 12$^a$ may become effective. This is accomplished by providing on the lower mold plate 13 centrally with respect to the two upper mold members 12 a wedge strip 23 whose opposite sides are tapered in accordance with the taper on the faces 12$^c$ of the mold member extensions 12$^a$. The parts are so arranged and proportioned that as the press closes a pressure is exerted laterally on the front portions of the running board bodies overhanging the inner edges of the mold members 14 substantially equal to that exerted downward on top of the running board. In this way the entire rubber covering, i. e., that over the top and that extending over the front side of the running board, is securely and uniformly applied. The lateral wedging action which takes place just as the press closes does not prevent the application of a ribbed configuration to the top of the rubber covering nor the provision of a more or less thickened rib around the margin of the top rubber surface as the ribbing is not of any considerable depth.

As the press closes, the superposed pairs of mold members are preferably aligned by dowels 24, note Figs. 7 and 8, which in this instance are arranged on the upper mold plates 11 and are adapted to engage into openings in the lower mold plate 13. The dowel pins are sufficiently tapered so that they do not interfere with the lateral movement which is imparted to the upper mold members 12 and the corresponding mold plates 11, but they do come into close engagement with the walls of the dowel pin openings in the companion member at substantially the instant that the closing movement terminates, in fact they may be utilized to assist the wedge strip 23 in imparting the lateral movement to the upper mold members 12 and centralize or align the parts in case the wedge strip 23 does not entirely perform this function because of wear.

The upper mold plates 11 and the mold members 12 secured thereto are held onto the lower side of the platen 10 by end plates 25, these end plates being secured by screws to the top face of the platen at the ends thereof and both the plates 25 and the ends of the mold plates 11 have overlapping notched portions so that the end plates retain the upper mold plates against the lower side of the platen and where they overlap the ends of the mold plates they form guideways for the lateral movement thereof, i. e., the inward movement by the springs 21 when the press opens and the outward movement as they are wedged apart on the closure of the press. The upper mold plates 13 and the upper mold members 14 are secured at their ends to the upper side of the platen by somewhat similar end plates 26 and these end plates and the upper mold plate also have notched overlapping portions or overlapping flanges, but in this case the end plates hold the mold plate tightly against the upper face of the platen. They are held from sliding out beneath the end plates by holding blocks 27 (see Fig. 14) which fit under the overhanging flanges of the end plates and are removably secured in place. If it is desired to remove the upper mold members, this can be readily done by removing the spring blocks 22 holding the springs 21 and by sliding the upper mold plates with the mold members attached thereto laterally out from beneath the end plates 25. To remove the upper mold plate and its mold members, the end blocks 27 are removed and the end plates 26 are somewhat loosened whereupon the upper mold plate can be slid out from beneath the flanges of these end plates.

One other feature remains to be described, that being the means for facilitating the unloading of the press.

As previously stated, as the press closes the flanges of the running board bodies are driven into slots provided therefor in the lower mold members. In many instances, therefore, difficulty is encountered in freeing the running boards from the lower mold members when the press is opened. To overcome this disadvantage, I may and in some instances prefer to provide lifting hooks which as the press opens automatically lift the running boards from the lower mold members, this part of the invention being illustrated in Figs. 9 to 12 inclusive.

The lifting hooks, which are designated 30, are preferably provided on the upper mold member, two at each end of each upper mold. These lifting hooks are mounted on pintles 31 supported in brackets 32 secured to the upper mold members, and each hook has an elongated slot 33 (note Fig. 11) which enables the hook to rise and fall as the members of the press are relatively moved in opening and closing. On the lower mold members recesses 34 are provided to accommodate these hooks, note Figs. 4, 10, 11 and 12, these recesses extending inwardly so as to intersect the slots 19 which accommodate the flanges 16 which extend downwardly from the ends of the running board body, as well illustrated in Fig. 11.

These hooks are so formed and mounted that when they are suspended on the pins 31 they hang by gravity so that the noses of the hooks are outwardly of the line of the slots which receive the end flanges 16, but I provide in the recesses 34 of the lower mold members springs 35 so disposed that as the press closes the noses of the hooks are pushed inwardly so as to lie beneath the end flanges 16, as indicated in Fig. 11.

When the press is being opened, the pins 31 ride upwardly in the slots 33 and when they reach the upper ends of the slots the hooks are elevated and engage under the end flanges 16 of the running board body and impart thereto an upward jerk which lifts the running board free of the lower mold member, and when the press is fully open the different running boards are suspended on the hooks between the upper and lower mold members. The operator then has simply to lift the running boards slightly to cause the hooks to swing outwardly by gravity and then may move them laterally outward from beneath the mold members of the press. In this way time is saved which might otherwise be expended by the operator in prying the running boards loose, for practice has demonstrated that in some instances they stick tightly.

As previously stated, the invention is preferably applied to a multi-platen press, and there is provided between each pair of platens the equivalent of two complete molds. Accordingly, a press of this kind has large capacity, and by providing a battery of several of these presses a crew can be kept constantly engaged in loading and unloading the presses that are open while other presses are closed for the time required for vulcanization.

In operation, the uncured rubber in sheet form is placed on the running board bodies so as to cover the portions of the top and front flange which are to be rubber covered. Then this running board with the rubber thereon is placed in the press and as the press closes the body of the running board is pressed down tightly against the lower mold member and just before the final closing movement, the upper mold member is shifted laterally by the wedge block or strip 23 so that the rubber is pressed against the front flange at the same time that it is pressed against the top of the running board body, both portions being molded and interlocked with the running board by means of the rivets 18 as well as by the adherence of the rubber to the running board body, which adherence takes place during the vulcanizing operation. After the press has been closed for a given time it is opened, and in opening the running boards are lifted clear of the lower mold member so that it can be quickly removed in the manner explained, and at the same time the upper mold members under the action of the springs 21 automatically move inwardly toward each other so as to be positioned properly for the next closing operation.

Having thus described my invention, I claim:

1. A press for molding and securing plastic material onto the top and side of a metal body comprising upper and lower mold members, one being held in fixed position on a platen of the press and adapted to receive the metal body and the other being laterally movable and adapted to be so moved in the closing operation as to engage and press between it and the other member the top and side of the metal body and secure the plastic material thereto.

2. A press for molding plastic material onto the top and side of a metal body comprising a pair of platens having upper and lower mold members one of which is laterally movable and the other of which is fixed and adapted to receive the metal body, means for wedging the laterally movable mold member laterally in the closing operation, both mold members having angularly disposed working portions which in the closing operation cooperate to mold the plastic material and secure it to the top and side of the metal body.

3. A press for molding plastic material onto angularly disposed portions of a metal body comprising a pair of platens having upper and lower mold members one of which is slidably supported for lateral movement and has angularly disposed working faces cooperating with similarly disposed working portions of the other which is fixed and adapted to receive the metal body, a spring for engaging the laterally movable mold member and normally serving to hold it in a given position, and means for forcing the movable mold member laterally against the action of the spring while the press is being closed to engage and press between it and the other member the angularly disposed portions of the metal body.

4. In a press of the character described, a platen having a mold member carried thereby, end members on the platen and overlapping the ends of the mold member whereby the mold member is normally held to the face of the platen and may be removed by sliding it laterally from beneath the overlapping portions of the end members.

5. In a press, a pair of platens having mold members on their adjacent faces, end plates secured to the platens and overlapping the ends of both mold members whereby they may be removed by laterally moving the mold members from beneath the overlapping portions of the end plates, the end plates holding one mold member securely to the platen, and the other mold member relatively loosely so it may be moved laterally when the platens are moved relatively.

6. A press of the character described comprising a pair of platens having mold members on adjacent faces thereof, the upper member having lifting means adapted to engage under the member operated on in the press so as to lift it clear of the lower mold member as the press opens.

7. In a press of the character described, a pair of relatively movable mold members, the lower member being adapted to receive the work piece to be operated upon, and the upper mold member having hooks adapted to engage under the work piece when the press closes, the lower member having means for moving the hooks inwardly in the closing operation.

8. A press of the character described, comprising a pair of relatively movable platens having cooperating mold members on adjacent faces thereof adapted to receive therebetween a body to be operated upon, one of said members having means thereon adapted to be moved to position for engagement with the body operated upon as the press closes and to separate said body from the other mold member as the press opens.

9. In a press for molding plastic material onto top and side portions of metal bodies, a pair of upper and lower relatively movable platens, one of said platens having fixed thereon a pair of mold members each having means for supporting top and side portions of a metal body and the other platen having mounted thereon two separate mold members adapted to be moved laterally to cooperate with the first mentioned mold members in pressing therebetween the plastic material and said top and side portions of the metal bodies, means for moving said separate mold members toward each other when the press is being opened, and means for wedging said separate mold members apart and into cooperation with the first mentioned mold members when the press is being closed.

In testimony whereof, I hereunto affix my signature.

BUDD BRONSON.